(12) United States Patent
van den Heuvel

(10) Patent No.: US 12,662,039 B2
(45) Date of Patent: Jun. 23, 2026

(54) TRANSPORT SYSTEM

(71) Applicant: Ford Global Technologies, LLC,
Dearborn, MI (US)

(72) Inventor: Bas van den Heuvel, Wijnandsrade
(NL)

(73) Assignee: Ford Global Technologies, LLC,
Dearborn, MI (US)

( * ) Notice: Subject to any disclaimer, the term of this
patent is extended or adjusted under 35
U.S.C. 154(b) by 573 days.

(21) Appl. No.: 18/103,814

(22) Filed: Jan. 31, 2023

(65) Prior Publication Data

US 2023/0302984 A1 Sep. 28, 2023

(30) Foreign Application Priority Data

Mar. 24, 2022 (DE) .......................... 102022106931.1

(51) Int. Cl.
| | |
|---|---|
| *B60P 3/00* | (2006.01) |
| *A47B 53/02* | (2006.01) |
| *B60P 1/64* | (2006.01) |
| *B60P 7/13* | (2006.01) |
| *B65G 1/10* | (2006.01) |
| *B60J 5/06* | (2006.01) |
| *B60P 3/20* | (2006.01) |

(52) U.S. Cl.
CPC .............. *B60P 3/007* (2013.01); *A47B 53/02*
(2013.01); *B60P 1/6427* (2013.01); *B60P*
*1/6481* (2013.01); *B65G 1/10* (2013.01); *B60J*
*5/062* (2013.01); *B60P 3/205* (2013.01); *B60P*
*7/13* (2013.01)

(58) Field of Classification Search
CPC ...... A47B 53/02; B60P 1/6427; B60P 1/6481;
B60P 3/007; B60P 3/205; B65G 1/10;
B60J 5/062
USPC .................................................. 414/498, 679
See application file for complete search history.

(56) References Cited

U.S. PATENT DOCUMENTS

| | | | | |
|---|---|---|---|---|
| 2,974,996 A | * | 3/1961 | Bitterman ................ | B60J 5/062 |
| | | | | 49/125 |
| 3,385,459 A | * | 5/1968 | Wellman, Jr. ........... | B60P 1/003 |
| | | | | 414/508 |
| 3,724,389 A | * | 4/1973 | Greaves ................. | A47B 53/02 |
| | | | | 104/162 |

(Continued)

FOREIGN PATENT DOCUMENTS

| | | | | |
|---|---|---|---|---|
| CN | 113180377 A | * 7/2021 | ............. | A47B 63/00 |
| DE | 20001120 U1 | 3/2000 | | |

(Continued)

*Primary Examiner* — James Keenan
(74) *Attorney, Agent, or Firm* — Vichit Chea; Price
Heneveld LLP

(57) ABSTRACT

A transport system has a transport vehicle comprising a load
area having a load surface on which a plurality of rack units
of the transport system can be arranged one behind the other
in a vehicle longitudinal direction and can be either locked
in position or displaced in the vehicle longitudinal direction,
whereby an accessible intermediate space can be produced
between two adjacent rack units. In order to enhance
improve the effective usability of a load space of a com-
mercial vehicle, the transport vehicle is configured such that
the intermediate space can be accessed regardless of the
position thereof from an access side arranged laterally in the
vehicle transverse direction.

18 Claims, 8 Drawing Sheets

(56) References Cited

U.S. PATENT DOCUMENTS

| | | | | |
|---|---|---|---|---|
| 4,119,376 | A | * | 10/1978 | Moyer ................... A47B 53/02 |
| | | | | 312/200 |
| 4,256,355 | A | * | 3/1981 | Yamaguchi ............ A47B 53/02 |
| | | | | 74/577 M |
| 4,668,008 | A | * | 5/1987 | Stinson ................... B60J 5/062 |
| | | | | 105/378 |
| 9,445,667 | B2 | * | 9/2016 | McCuistion ........... A47B 53/02 |
| 10,552,792 | B2 | * | 2/2020 | Mattingly ............... B65G 1/10 |
| 10,609,837 | B2 | * | 3/2020 | Naor ..................... A47B 53/02 |
| 10,919,700 | B2 | * | 2/2021 | Bourke .................. A47B 53/02 |
| 11,840,169 | B2 | * | 12/2023 | Seemüller ............... B65G 1/10 |
| 12,017,547 | B2 | * | 6/2024 | Kazyak .................. B60P 3/007 |
| 2010/0019631 | A1 | * | 1/2010 | Olson ................... A47B 53/02 |
| | | | | 312/215 |
| 2020/0377000 | A1 | * | 12/2020 | Saviranta ............... B60P 3/007 |
| 2023/0173985 | A1 | * | 6/2023 | Lem ....................... B60P 3/007 |
| | | | | 296/3 |

FOREIGN PATENT DOCUMENTS

| | | | | | |
|---|---|---|---|---|---|
| DE | 102006025876 | A1 | | 12/2007 | |
| DE | 102007010658 | B3 | * | 8/2008 | .............. B60P 3/007 |
| DE | 102012205812 | A1 | | 10/2013 | |
| DE | 102016001470 | A1 | * | 8/2016 | .............. B60P 3/007 |
| DE | 102016106456 | A1 | | 10/2017 | |
| DE | 102016010688 | A1 | | 3/2018 | |
| DE | 102018001734 | A1 | | 9/2019 | |
| DE | 102018105778 | A1 | | 9/2019 | |
| EP | 0377345 | B1 | * | 7/1992 | .............. B60J 5/062 |
| EP | 1219484 | A2 | * | 7/2002 | .............. B60P 3/20 |
| EP | 1262364 | A2 | | 12/2002 | |
| GB | 2139273 | A | * | 11/1984 | .............. B60J 5/062 |
| GB | 2225928 | A | * | 6/1990 | .............. A47B 53/02 |
| KR | 100987608 | B1 | * | 10/2010 | .............. A47B 53/02 |
| KR | 20120073776 | A | * | 7/2012 | .............. A47B 53/02 |

* cited by examiner

TRANSPORT SYSTEM

CROSS-REFERENCE TO RELATED APPLICATION

This application claims foreign priority benefits under 35 U.S.C. § 119(a)-(d) to German Patent Application No. 102022106931.1 filed on Mar. 24, 2022, which is hereby incorporated by reference in its entirety.

FIELD OF THE DISCLOSURE

The present disclosure generally relates to a transport system, and more particularly relates to a transport system having a transport vehicle and rack units.

BACKGROUND OF THE DISCLOSURE

It is generally known in commercial transport vehicles such as delivery vans or lorries to arrange in the load space racks which have open and/or closed compartments or shelves. This concerns, for example, vehicles in the logistics sector, with which consignments are transported to customers or to parcel stations or vehicles which are used by tradesmen. With the use of the racks, both the location of specific parts of the load and access to such parts are made substantially easier. However, in order that the user, for example the driver of a delivery vehicle, is able to reach all the racks, a substantial part of the floor area of the load space typically should be kept free. In order to make up for this disadvantage, the vehicle as a whole could be made larger, but it is then more difficult to maneuver and to park and additionally has a higher energy consumption. On the other hand, without such racks, not only is targeted access to individual parts made more difficult, it may also be more difficult to effectively use the full height of the load space because stacking of the load can be problematic.

It would be desirable to enhance the optimal and effective usability of a load space of a commercial transport vehicle.

SUMMARY OF THE DISCLOSURE

According to a first aspect of the present disclosure, a transport system is provided and includes a transport vehicle comprising a load area having a load surface. The transport system also includes a plurality of rack units arranged on the load surface one behind the other in a vehicle longitudinal direction and configured to be either locked in position or displaced in the vehicle longitudinal direction, whereby an accessible intermediate space can be produced between two adjacent rack units, wherein the transport vehicle is configured such that the intermediate space can be accessed regardless of the position thereof from an access side arranged laterally in a vehicle transverse direction.

According to a second aspect of the present disclosure, a transport system is provided and includes a transport vehicle comprising a load area having a load surface. The transport system also includes a plurality of rack units arranged on the load surface one behind the other in a vehicle longitudinal direction and configured to be either locked in position or displaced in the vehicle longitudinal direction, whereby an accessible intermediate space can be produced between two adjacent rack units, wherein the transport vehicle is configured such that the intermediate space can be accessed regardless of the position thereof from an access side arranged laterally in a vehicle transverse direction, wherein the load area has at least one guide element which extends in the vehicle longitudinal direction and with which the plurality of rack units cooperate, so that the plurality of rack units are displaceable in a guided manner in the vehicle longitudinal direction, and wherein the load area is at least partly open on the access side, so that a side wall, arranged on the access side, of at least one rack unit forms an outer surface of the load area.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
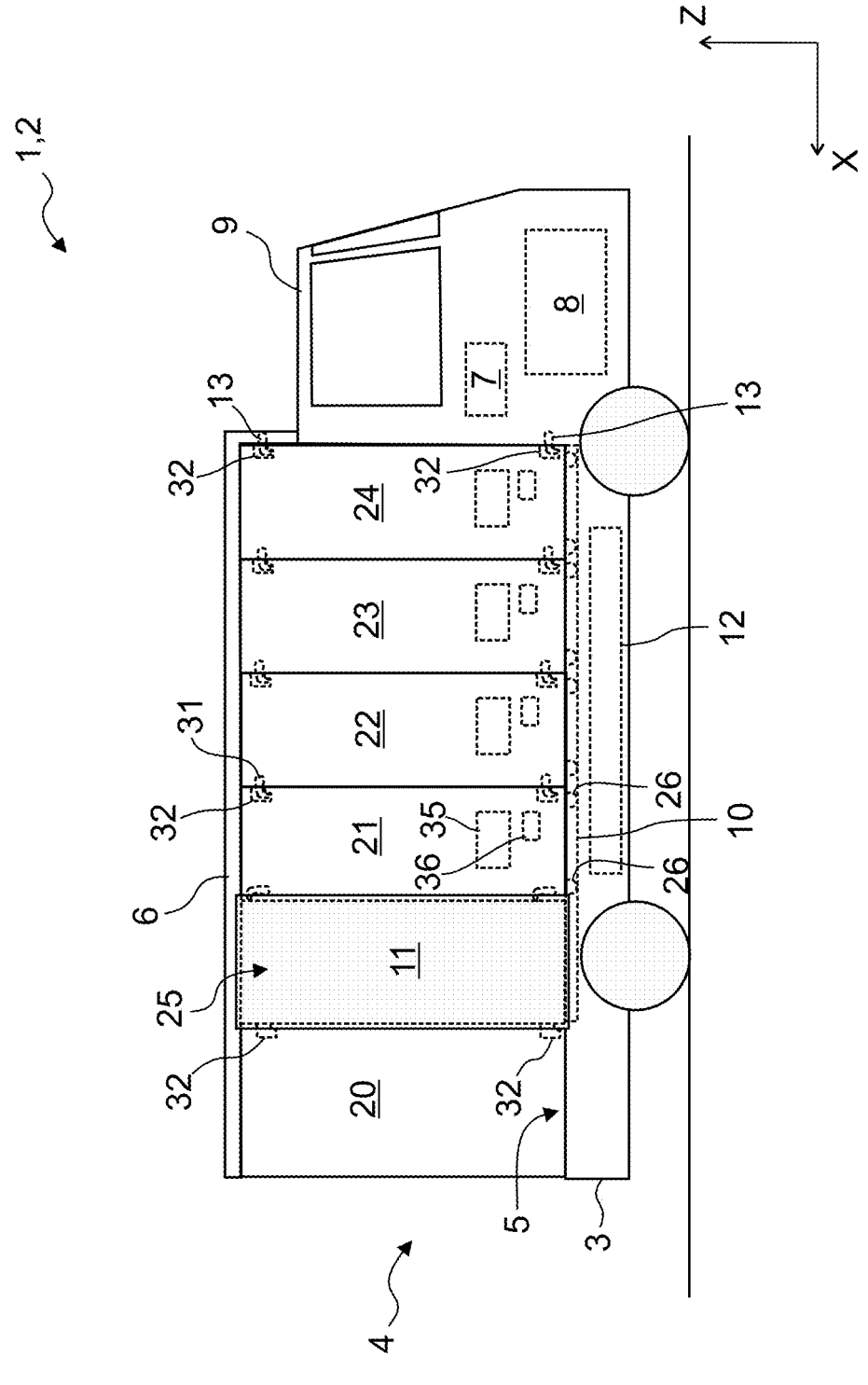
FIG. 1 is a schematic side view of a transport vehicle and of a plurality of rack units of a transport system according to a first embodiment in a first state.

FIG. 1 shows a schematic representation of a transport system 1 according to a first embodiment, which comprises a transport vehicle 2, for example a van, and a plurality of rack units 20-24. The rack units 20-24 are accommodated on a load surface 5 of a load area 4 of the transport vehicle 2, which load surface is part of a chassis 3 or is supported on the chassis. In or on the load surface there are arranged two guide rails 10 which run in the vehicle longitudinal direction X and are spaced apart in the vehicle transverse direction Y and which can each be in the form of a U-shaped profile which is open to the top. At the front relative to a vehicle longitudinal direction X, the transport vehicle 2 has a driver's cab 9 for a user 50. In this example, the transport vehicle 2 is configured to be controlled by the driver or user 50, but it could alternatively also be an autonomous, self-driving vehicle. The transport vehicle 2 has an electric drive motor 8 which is configured to drive the transport vehicle 2. There is further provided a vehicle battery unit 12 which is able to supply energy to various systems of the transport vehicle 2, optionally also at least in part to the drive motor 8. A vehicle control unit 7 is additionally integrated in the transport vehicle 2, the functioning of which will be described hereinbelow.

Figure 2:
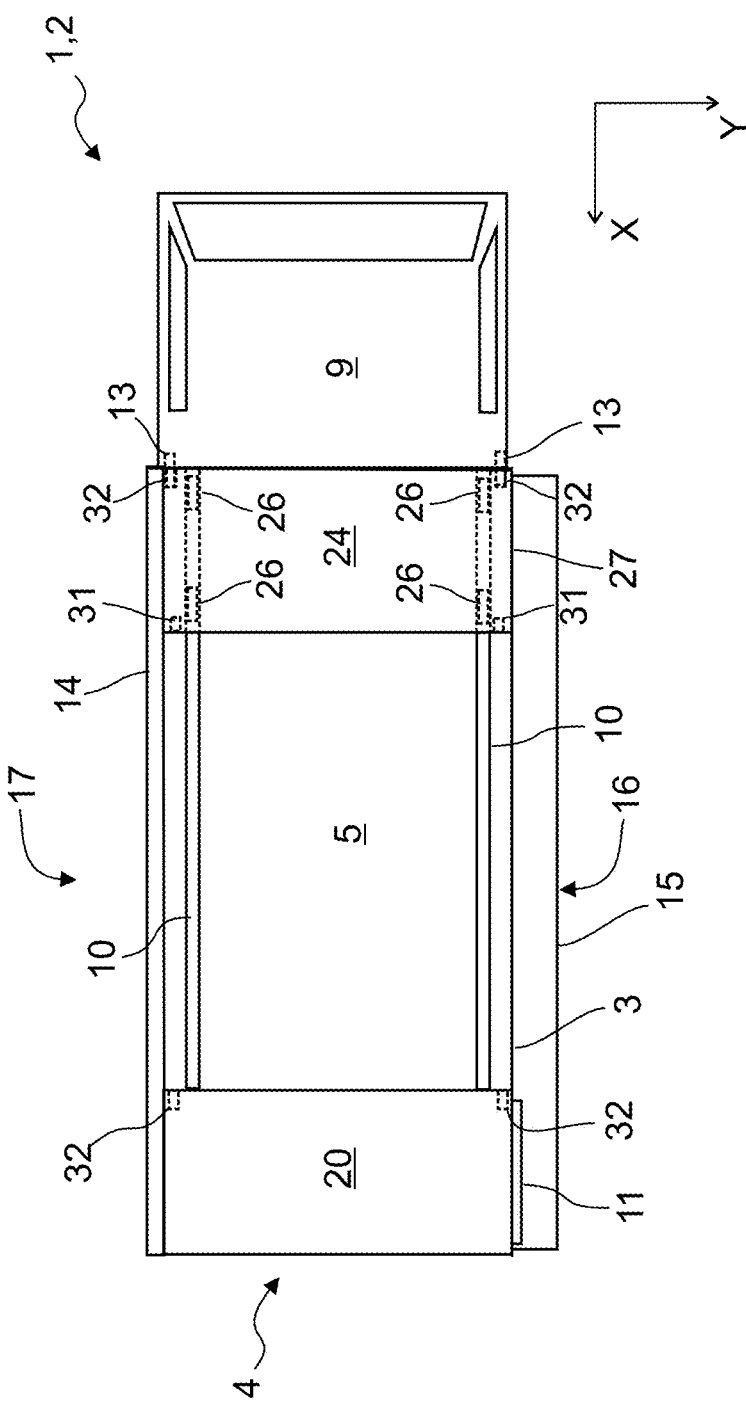
FIG. 2 is a schematic plan view of a sectional representation of the transport system of FIG. 1.

Considering FIG. 1 and FIG. 2 together, it can be seen that the load area 4 is predominantly open on an access side 16, in this case the right side, while on an opposing opposite side 17 (the left side) it is closed by a vehicle side wall 14.

However, a sliding door 11, which is movable in the vehicle longitudinal direction X, is arranged on the access side 16. The load area 4 is closed at the top by a roof 6. The roof is supported inter alia by the vehicle side wall 14 and by a rearmost rack unit 20 in the vehicle longitudinal direction X, which in this example is permanently connected to the load surface 5 or the chassis 3. The section plane in FIG. 2 runs beneath the roof 6, the second, third and fourth rack units 21-23 having been omitted for reasons of clarity.

Figure 3A:
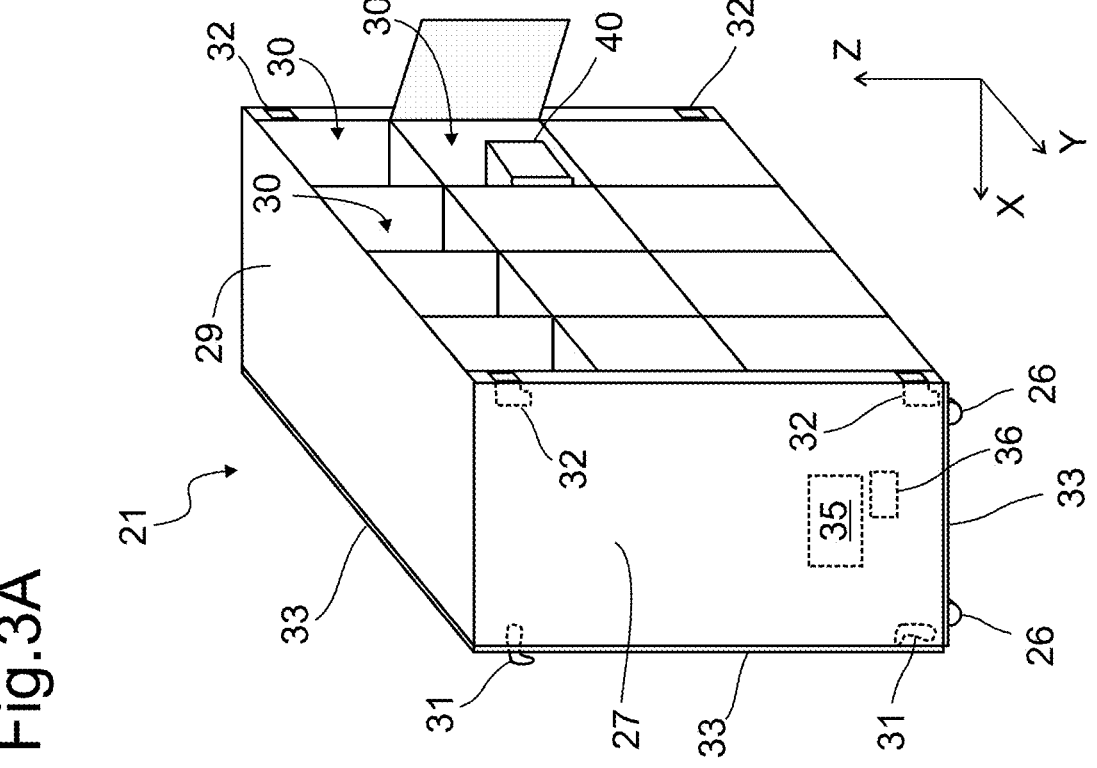
FIG. 3A is a perspective side view representation of a rack unit of the transport system of FIG. 1.
Figure 3B:
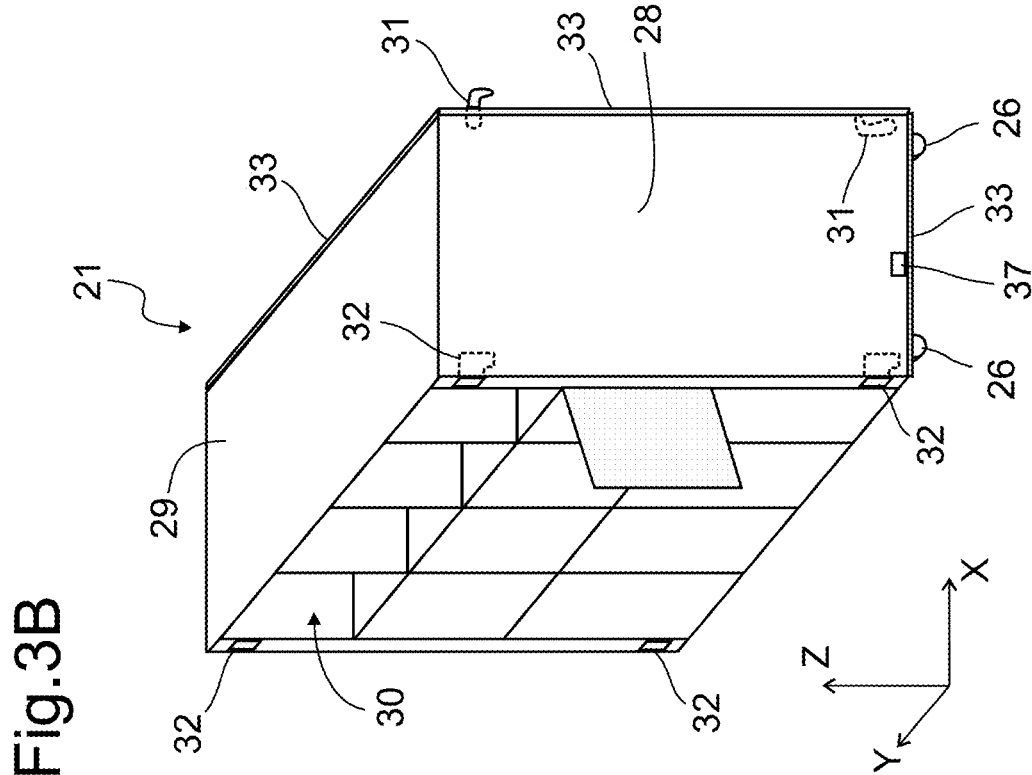
FIG. 3B is a perspective side view representation of a rack unit of the transport system of FIG. 1.

As is shown in the perspective representations in FIGS. 3A and 3B, the second rack unit 21 has a plurality of storage compartments 30 for parcels 40 or other goods. Some of the storage compartments 30 are open, others are closed, that is to say they can be closed by an access door. Some storage compartments 30 can have special functions, for example a cooling function or a disinfecting function. The energy necessary therefor can be acquired from a rack battery unit 35. An integrated rack control unit 36 can control this and/or other functions of the rack unit 21. The rack unit 21 has a total of four wheels 26 which fit into the guide rails 10, whereby the rack unit 21 is displaceable in a guided manner in the vehicle longitudinal direction X. Specifically, the wheels 26 are connected to at least one actuator (not shown here), so that the rack unit 21 can be driven in a self-driving manner. The drive system so formed can be controlled by the rack control unit 36.

A first rack side wall 27 faces the access side 16, while a second rack side wall 28 faces the vehicle side wall 14. Because the load area 4 is predominantly open on the access side 16, the first rack side wall 27 mostly forms an outer surface, which is exposed to weather influences, for example. For this reason, it is weatherproof, in particular water-tight. At the top, the rack unit 21 has a rack top wall 29. At the bottom and at the rear (based on the vehicle longitudinal direction X) of the first rack side wall 27 and at the rear of the rack top wall 29 there are arranged sealing elements 33, which can be formed of an elastomer. The sealing elements are provided for establishing liquid-tight contact with the transport vehicle 2 and with the rearmost or first rack unit 20, when the second rack unit 21 is arranged directly adjacent to the first rack unit 20. At the rear, the rack unit 21 has four locking elements 31, which are here shown schematically as rotatable hooks. At the front there are formed a total of four latch receptacles 32, into which corresponding locking elements 31 of the third rack unit 22 can engage. By pivoting the locking elements 31, adjacent rack units 20-24 can be locked in position relative to one another, wherein a tensile force is also exerted in the vehicle longitudinal direction X as a result of the locking and compresses the interposed sealing elements, which enhances their sealing action. In order to be able to lock the fifth rack unit 24 in position, the transport vehicle 2 has corresponding locking elements 13 which are able to engage into the latch receptacles 32 of the fifth rack unit 24.

In this example, the locking elements 13, 31 may be operated by actuators (not shown), which in turn are actuated by the rack control unit 36 or the vehicle control unit 7. Alternatively, they could, however, also be operable manually, for example. Instead of a mechanical locking system, the locking elements 13, 31 could be replaced by electromagnets, while elements of a ferromagnetic metal are used instead of the latch receptacles 32. On the second rack side wall 28 the rack unit 21 has a rack-mounted connector 37, which here is shown in highly simplified form. It can be connected to a vehicle-mounted connector (not shown), which can be arranged on a cable, for example, so that the connection is maintained even when the rack unit 21 is displaced. Using this electrical connection, an energy transfer between the rack battery unit 35 and the vehicle battery unit 12 can be carried out. As a result, either the vehicle battery unit 12 can be charged at the expense of the rack battery unit 35, or vice versa. In addition, it would be conceivable that energy may be transferred between the rack battery units 35 of different rack units 20-24.

Optionally, a data exchange can also take place via the connector 37. Alternatively or additionally, the rack control unit 36 and the vehicle control unit 7 can, however, also communicate wirelessly with one another. The vehicle control unit 7 can thus detect the presence of the rack unit 20-24, for example. The rack control unit 36 can retrieve stored information about the size of the rack unit 21, about the size, form and contents of the storage compartments 30, the destination location of the contents, etc., which can then be transmitted to the transport vehicle 2. In addition, the rack control unit 36 can retrieve and transmit to the vehicle control unit 7 the position of the rack unit 21, the state of the locking elements 31 and/or other data. Conversely, the vehicle control unit 7 can send various commands to the rack control unit 36, for example a command to lock or unlock the locking elements 31, to automatically open a storage compartment 30 and to displace the rack unit 21.

While FIGS. 3A and 3B show only the second rack unit 21, the third, fourth and fifth rack units 20 to 24 may be of a similar construction, although they may differ in respect of the form of the storage compartments 30. In this example, the second to fifth rack units 21-24 have the same length in the vehicle longitudinal direction X, which is not necessarily the case, however. In addition, instead of being accessible from the front, the storage compartments 30 of individual rack units 20-24 can alternatively be accessible from the rear or also from both sides.

Figure 4:
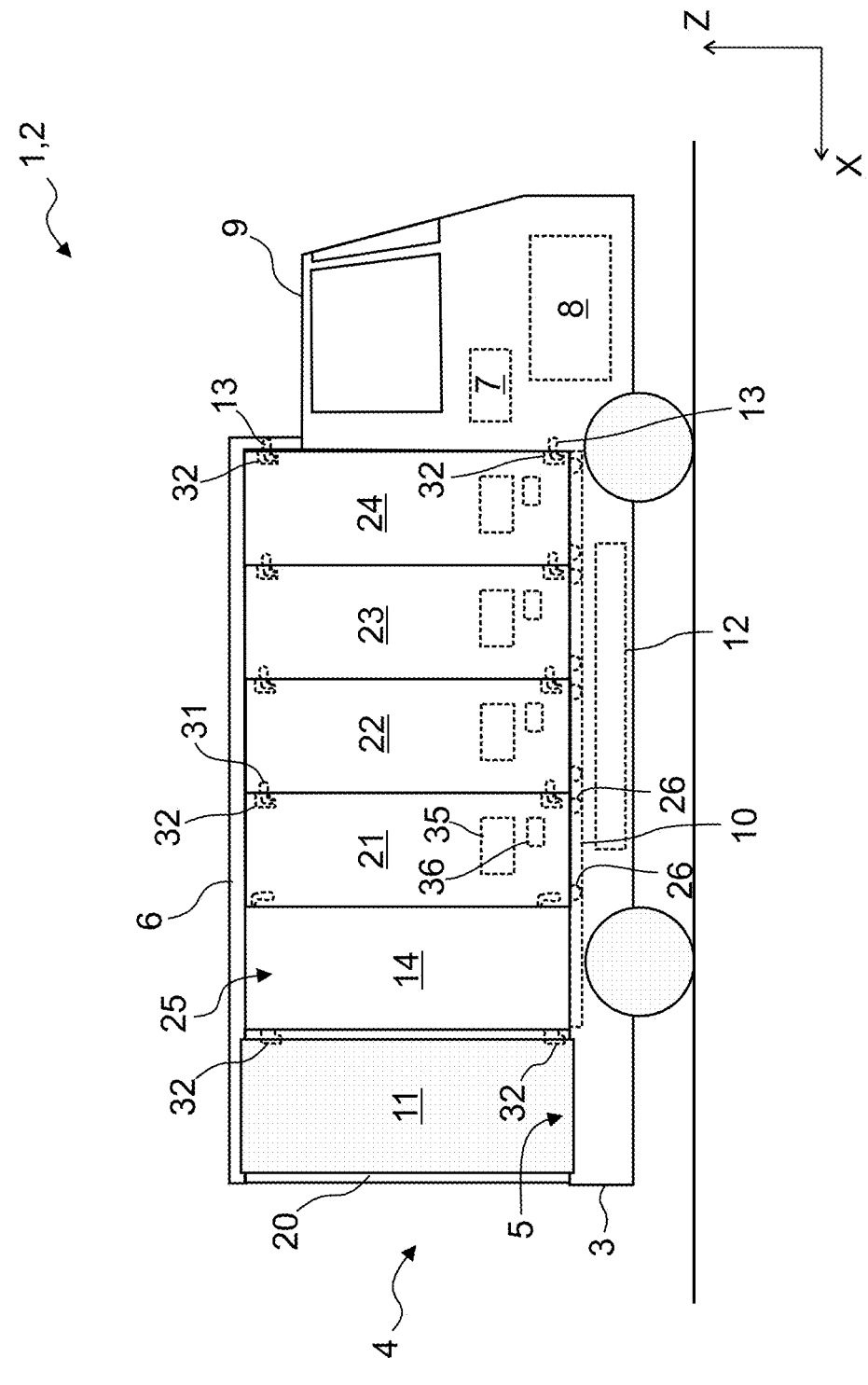
FIG. 4 is a schematic side view of the transport system of FIG. 1 in a second state.

FIG. 1 shows a state in which the second to fifth rack units 21-24 have been displaced forwards as far as possible and locked in the corresponding position. An intermediate space 25 is here provided between the first rack unit 20 and the second rack unit 21 and is closed on the access side 16 by the sliding door 11 and thus protected from weather influences and unauthorized access. The sliding door 11 together with the first rack side walls 27 thus forms the outer surface of the load area 4 on the access side 16. When the transport vehicle 2 has arrived at a location at which access to the first rack unit 20 is required, the sliding door 11 can be moved so that access to the intermediate space 25 is possible. This state is shown in FIG. 4. The intermediate space 25 is sufficiently large that the user 50 is able to step into it or position himself in it while he accesses the storage compartments 30. In order to facilitate access for the user 50, a footboard 15 shown only in FIG. 2 can optionally be provided on the access side 16 adjacent to the load surface 5, which footboard can be configured, for example, to be folded out or extended so that it does not project too far from the chassis 3 laterally during normal driving operation.

Figure 5:
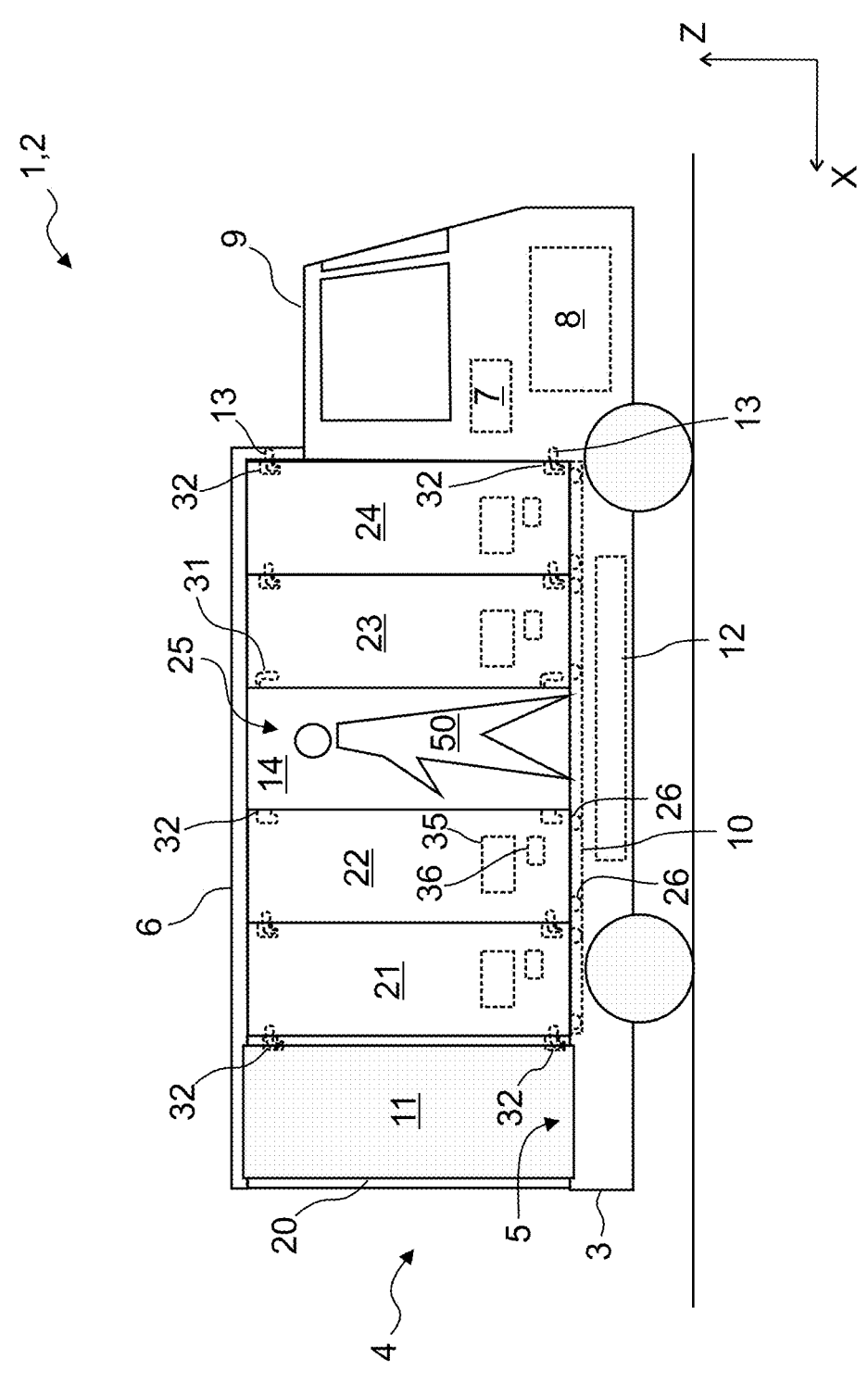
FIG. 5 is a schematic side view of the transport system of FIG. 1 in a third state.

While FIG. 4 corresponds to a situation in which the first rack unit 20 is to be accessed, FIG. 5 corresponds to a situation in which the user 50 wishes to access the third rack unit 22. To this end, the second and third rack units 21, 22 are displaced backwards in the vehicle longitudinal direction X, for which purpose the vehicle control unit 7 can send corresponding control commands to the rack control units 36. This can in turn be initiated automatically in that the vehicle control unit 7 determines a current location of the transport vehicle 2 and compares the current location with destination locations of the contents of the individual storage compartments 30. The destination locations can in turn be retrieved by communication with the individual rack control units 36, if the corresponding information has been stored locally in the rack units 20-24. On the basis of this information, the vehicle control unit 7 can also send an instruction to the rack control unit 36 to open a particular storage compartment 30.

When the user 50 has removed and, for example, delivered the contents of the corresponding storage compartment 30, the intermediate space 25 must be closed again for the continuation of the journey. To this end, the sliding door 11 can be moved in the vehicle longitudinal direction X, so that it is arranged in front of the intermediate space 25. The rack units 20-24 can here remain in the positions shown in FIG. 5. Closing of the intermediate space 25 can take place automatically, for example if it is determined that the user 50 has returned to the driver's cab 9.

Figure 6:
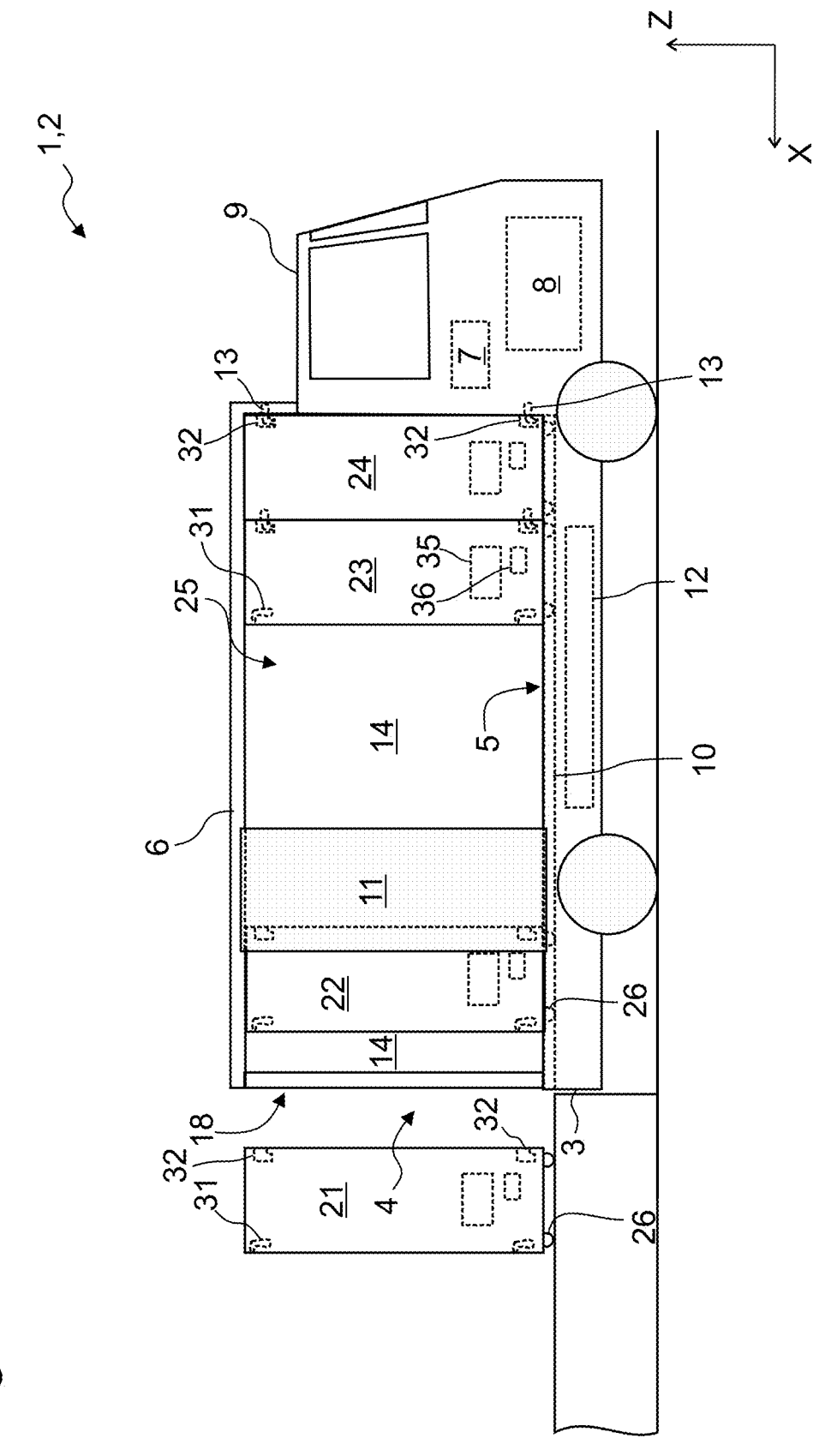
FIG. 6 is a schematic side view of a transport vehicle and of a plurality of rack units of a transport system according to a second embodiment.

FIG. 6 shows a second embodiment of a transport system 1 which largely corresponds to the first embodiment and in this respect will not be repeatedly explained in detail again. However, in this case the first rack unit 20 is not permanently connected to the transport vehicle 2. Rather, all the rack units 20 to 24 can be introduced into and removed from the load area 4 via a loading side 18, in this case the rear side. An individual arrangement of the rack units 20 to 24 is thus possible, for example at a logistics hub, where the rack battery units 35 can also be charged.

Figure 7:
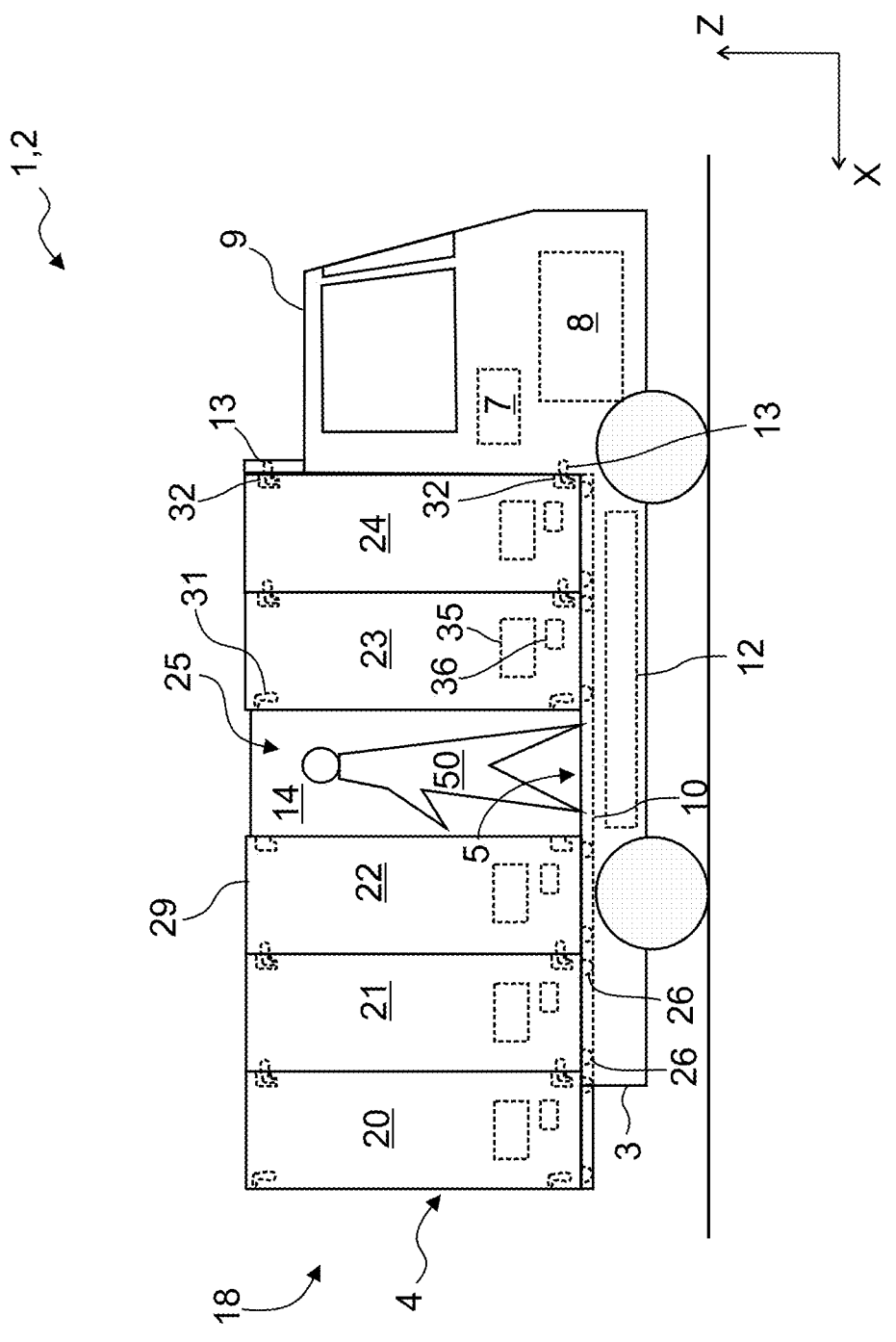
FIG. 7 is a schematic side view of a transport vehicle and of a plurality of rack units of a transport system according to a third embodiment in a first state.
Figure 8:
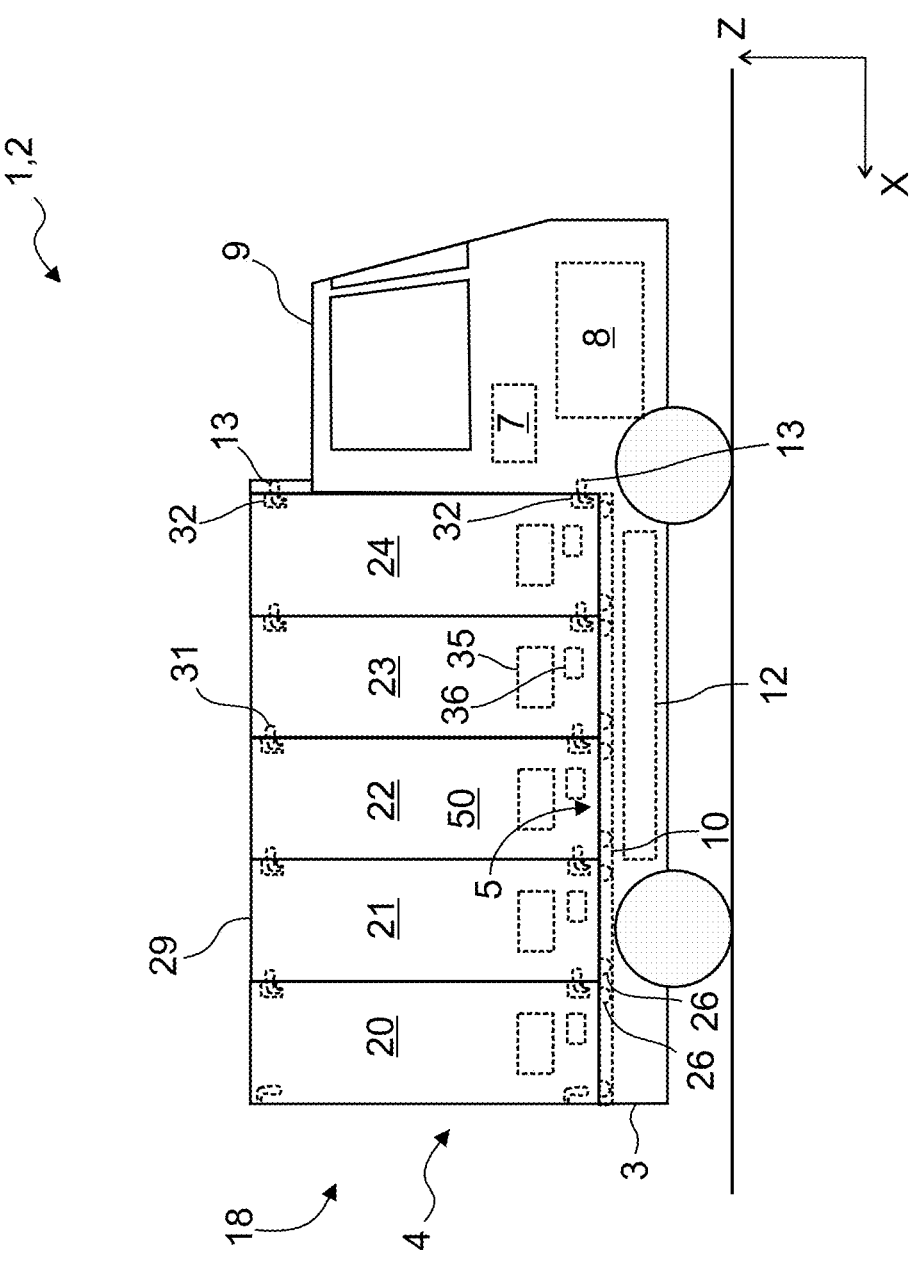
FIG. 8 is a schematic side view of the transport system of FIG. 7 in a second state.

FIGS. 7 and 8 show a third embodiment of a transport system 1 which again largely corresponds to the second embodiment. However, the transport vehicle 2 is here shorter in relation to the overall length of the rack units 20-24, so that the rack units must be arranged next to one another without gaps for the journey, in order to be accommodated above the load surface 5, as can be seen in FIG. 8. If the user 50 requires access to a rack unit 20-24, at least the first rack unit 20, or in the example of FIG. 7 the first to third rack units 20 to 22, must be displaced backwards in the vehicle longitudinal direction. To this end, the first rack unit 20 must be displaced backwards beyond the load surface 5, which is possible because the guide rails 10 can in this case be lengthened to the rear in a telescopic manner so that they are able to support the first rack unit 20 even outside the load surface 5. Because the first rack unit 20 thus moves backwards beyond the normal dimensions of the transport vehicle 2, it could be checked by means of sensors (not shown here), for example ultrasonic sensors, whether there is sufficient space behind the transport vehicle 2, before the displacement is carried out.

In this example too, the rack units 20-24 can be removed and introduced via the loading side 18. In contrast to the first and second embodiments, the transport vehicle 2 does not have its own roof above the load area 4. Rather, the load area 4 is protected at the top against weather influences by the rack top walls 29 of the individual rack units 20-24. To this end, all the rack units 20-24 must of course be arranged close together for the journey, as is shown in FIG. 8. In this embodiment, the sealing element 33 arranged on the rack top wall 29 is of particular importance, while it could optionally also be omitted in the first and second embodiments. Also, the rack top wall 29 could be less robust, discontinuous or in some circumstances omitted altogether in the first and second embodiments.

It is noted that the features and measures presented individually in the following description can be combined with one another in any technically expedient manner and show further embodiments of the disclosure. The description additionally characterizes and gives details of the transport system in particular in association with the figures.

As shown and described herein, a transport system is provided which serves to transport and store goods. In some embodiments, the goods can be consignments, or small consignments, or parcels, for example. The transport system includes a transport vehicle, which in turn includes a load area having a load surface. The transport vehicle is generally a road vehicle, for example a motor vehicle such as a lorry or van. It may also be an autonomous motor vehicle, which is thus adapted to navigate from one place to another (also) without input from a driver. The transport vehicle includes a load area which, depending on the embodiment, can be at least partly open and/or at least partly closed, wherein in some embodiments it can also be referred to as a load space. A load surface, which could also be referred to as a load floor, normally forms the lowermost part of the load area. As a whole, it is sufficiently stable to support the load intended for the transport vehicle. It can in turn be supported on a chassis of the transport vehicle, for example, or also integrated at least partly in the chassis.

On the load surface, a plurality of rack units of the transport system can be arranged or have been arranged one behind the other in a vehicle longitudinal direction and either can be locked or have been locked in position or can be displaced or have been displaced in the vehicle longitudinal direction, whereby an accessible intermediate space can be produced between two adjacent rack units.

The rack units are part of the transport system and, depending on the embodiment, can also be part of the transport vehicle or associated therewith. The rack unit can in some circumstances also be referred to as a "rack." It serves to hold or store goods or parts of the load. In particular, it can be configured to store consignments, or small consignments, but other possibilities are also provided. The rack unit has at least one shelf surface, generally a plurality of shelf surfaces arranged one above the other. The region between two shelf surfaces can also be referred to as a storage compartment or stowage compartment, or in the case of a division in the horizontal direction it can form a plurality of storage compartments. Each storage compartment can be open, but it can also have side walls and/or a rear wall. Likewise, a storage compartment can be provided with an access door or access hatch, which in some circumstances can also have a lock which can only be opened by an authorized user. As will be explained hereinbelow, the rack unit can also have elements or functions which are not generally typical for a rack.

A plurality of such rack units can be arranged or have been arranged on the load surface one behind the other in a vehicle longitudinal direction (X-direction). It will be appreciated that the transport vehicle is adapted to transport the rack units arranged on the load surface, for example to a destination location at which at least one rack unit must be accessed. The rack units can be arranged or have been arranged on the load surface in such a manner that they either—that is to say as alternatives—can be locked or have been locked in position or can be displaced or have been displaced in the vehicle longitudinal direction. This usually applies to each rack individually. It is thus possible to lock the rack unit in position relative to the load surface, so that it is secured against unintentional changes of position, for example while the transport vehicle is moving or on ground that is not level. Slight changes of position which do not adversely affect usability can be disregarded. Locking in position is provided at least in the vehicle longitudinal direction and normally in a vehicle transverse direction. Locking in position in a vehicle vertical direction can additionally be provided. When the rack unit is not locked in position, it is displaceable, for example movable or adjustable, in the vehicle longitudinal direction. In simple terms, the rack unit can be displaced forwards or backwards, wherein a particular displacement may not be possible in a given case, for example because another rack unit or a wall of the load area is in the way. It is here conceivable that a single rack unit can be displaced or also a group of rack units arranged one behind the other.

By displacing the rack units it is possible to create between two adjacent rack units an intermediate space which is accessible. The intermediate space is formed above the load surface, or above part thereof. The intermediate space is accessible, which means that it is sufficiently large for a normal user to stand in. In order additionally to allow the user a certain freedom of movement when he is standing in the intermediate space, the intermediate space should be, for example, at least 30 cm, at least 40 cm or at least 50 cm long in the vehicle longitudinal direction. That is to say, by displacing the rack units it is possible to create an intermediate space which allows the user to position himself or herself between two adjacent rack units and thus to access one or both rack units, depending on the embodiment. All the other rack units can be adjacent to one another in pairs in the longitudinal direction, that is to say there can be no intermediate space or only a negligible intermediate space between them.

The transport vehicle is configured in such a manner that the intermediate space can be accessed regardless of the position thereof from an access side arranged laterally in the vehicle transverse direction. The access side is arranged laterally in the vehicle transverse direction, that is to say it is either the right or left side. It is also conceivable that both the right and the left side are in the form of an access side. In countries in which they drive on the right, the right side is normally configured as the access side, because the user will normally access the load area from that side when the transport vehicle is parked. Correspondingly, in countries in which they drive on the left, the left side is normally configured as the access side. The transport vehicle is configured in such a manner that the intermediate space can be accessed from the access side regardless of where the intermediate space is formed, that is to say between which rack units it is formed. Accordingly, it is always possible for the user to enter the accessible intermediate space via the access side and, from there, to access at least one rack unit. As will become clear hereinbelow, it may be necessary, in order to obtain access, to open or move a closing element, such as a door or the like, arranged on the access side. However, even in this case, access to the intermediate space is not permanently blocked, that is to say access is possible without changing the position of the intermediate space.

The transport system allows the load surface, or the space formed above the load surface, to be used efficiently, because the accessible intermediate space can be produced as required for access to a specific rack unit, while the rack units can otherwise be arranged close together in the longitudinal direction without wasting space. Most or even all of the width of the load surface can also be used.

Preferably, the transport vehicle has a vehicle control unit, which can control the various functions of the transport vehicle and optionally functions of the rack units. The vehicle control unit can have or be connected to a global positioning system (GPS) module, in order to be able to determine a position of the transport vehicle. Likewise preferably, at least one rack unit, a plurality of rack units or also all the rack units has/have an integrated rack control unit, which can control functions of the rack unit. The term "control unit" in each case implicitly includes the possibility of a data memory which is integrated in or can be accessed by the control unit. In particular, it can be provided that the vehicle control unit can communicate with each rack control unit, for example wirelessly.

Advantageously, each rack unit extends in the vehicle transverse direction at least over most of the width of the load surface. That is to say, when the rack unit is arranged as intended on the load surface, it extends in the vehicle transverse direction (Y-direction) over more than 50% of the width of the load surface. Advantageously, it can extend over at least 70%, at least 80% or at least 90% of the width of the load surface. In accordance with the width of each rack unit, it is not possible to arrange two rack units in the vehicle transverse direction, that is to say exactly one row of rack units arranged one behind the other in the vehicle longitudinal direction can be accommodated. However, the rack units are comparatively wide in relation to the load surface and in some embodiments can optimally utilize the width of the load surface. In particular, it is possible that an accessible space is no longer free on the load surface in the transverse direction laterally to the rack unit. This is not necessarily important, however, because the above-mentioned intermediate space can be created in the longitudinal direction, which allows the user access to any desired rack unit.

The load area may have on an opposite side arranged opposite the access side an at least predominantly closed side wall, which can provide weather protection, for example, from that opposite side. The side wall can also fulfil other functions, for example can prevent unauthorized access to the load area. The load area can additionally have a roof, which can likewise serve primarily as weather protection. It is here preferred if the rack units extend, from the load surface, up to at least 70% or 80% of the height of the roof.

In general, the rack units do not all have to be identical. For example, at least one rack unit could have open storage compartments, while another has closed or closable storage compartments. The storage compartments in different rack units could also be of different sizes. It is also possible to provide rack units which have different lengths in the vehicle longitudinal direction. Finally, some rack units could have storage compartments with special functions, for example with cooling, a disinfecting device or the like.

In order to assist with controlled displacement of the rack units, it may be preferred that the load area has at least one guide element which extends in the vehicle longitudinal direction and with which the rack units cooperate, so that they are displaceable in a guided manner in the vehicle longitudinal direction. The guide element can in particular be a guide rail, which cooperates via interlocking engagement with an element of the rack unit in question. It will be appreciated that a wide variety of forms are possible here. By way of example, the guide rail could be arranged on or in the load surface and form a type of U-shaped profile or depression in which rollers or sliders of the rack units are able to run. At least one guide rail could, however, also be arranged on the roof of the load area (where present) and/or on a side wall arranged opposite the access side.

The rack units and/or the transport vehicle can have locking elements in which two rack units can be locked together or a rack unit can be locked in position on the transport vehicle. On the one hand, locking of the rack units in position relative to the load surface can thereby be established or assisted. On the other hand, a particularly strong connection between the rack units can also be established, which, for example, can prevent gaps from unintentionally forming between the rack units. Each locking element can function differently. For example, it can operate electromagnetically or mechanically, wherein it typically establishes interlocking engagement, optionally also force-based engagement. The mechanical locking element can be operated by means of an actuator or also manually. Electromagnetic or actuator-mechanical locking elements can also be operated automatically, for example by a control unit of the transport vehicle, which can unburden the user.

One embodiment provides that the load area is at least partly open on the access side, so that a side wall, arranged on the access side, of at least one rack unit forms an outer surface of the load area. That is to say, on the access side the transport vehicle does not have a side wall, or does not have a continuous side wall, which would delimit the load area to the outside. Accordingly, the side wall, facing the access side, of at least one rack unit, optionally also the side walls of all the rack units, forms an outer surface, which thus faces the surroundings of the vehicle. The rack unit thus supplements the outer surface of the transport vehicle with its side wall. Accordingly, the side wall should be sufficiently weatherproof to protect the contents of the rack unit from weather influences, for example.

In addition, the rack units may have sealing elements by use of which liquid-tight contact between adjacent rack units can be established at least on the access side. Thus, when two rack units are arranged directly adjacent to one another, the sealing elements prevent liquids, in particular rainwater, from being able to pass between the rack units. In this embodiment, it is expedient to arrange all the rack units adjacent to one another in pairs for the journey, so that there is no appreciable intermediate space and the ingress of moisture is prevented. The corresponding arrangement of the rack units can preferably be carried out automatically, for example in such a manner that a control unit in the transport vehicle correspondingly displaces the rack units before departure (or optionally shortly after departure). In addition, the rack units and/or the transport vehicle can have sealing elements at least on the access side, by which liquid-tight contact between the rack unit and the transport vehicle can be established. If the transport vehicle is not to have an integrated roof, the top sides of the rack elements could form a weatherproof roof, wherein sealing elements may also be provided on the top side. The sealing elements are normally of rubber-elastic form, but other forms would also be conceivable. The function of the sealing elements can generally be optimized by locking elements, which act between rack units, for example, and press them together, wherein elastic deformation (e.g., compression) of the sealing element takes place.

On the one hand, it is conceivable that the side walls of the rack units form a closed outer surface on the access side, which is generally sufficient to protect the load area from weather influences and unauthorized access. An alternative embodiment provides that at least one door arranged on the access side is configured to close the intermediate space from the access side regardless of the position of the intermediate space. That is to say, the at least one door can close the intermediate space from the access side regardless of where or between which rack units the intermediate space is formed. The door can in particular be in the form of a sliding door, which is movable in the vehicle longitudinal direction such that it can be arranged in front of the intermediate space according to the current position thereof. A plurality of doors can also be provided. It would, however, also be conceivable that at least one door is configured, for example, in the manner of a roller shutter. The door in question can here close the load area on the access side along its whole length, or two roller-shutter-like doors could be provided, for example, of which one is arranged at the front part of the load area and the other is arranged at the rear part. Normally, the at least one door is configured both to prevent unauthorized access to the intermediate space and to protect the intermediate space and the adjoining rack units from weather influences. The door can also have sealing elements in order to establish liquid-tight contact with other parts of the transport vehicle and/or rack units.

It is possible that the rack units are permanently arranged in the load area and in a sense form parts of the transport vehicle. Alternatively, it can advantageously be provided that at least one rack unit can optionally be removed from and introduced into the load area via a loading side. The loading side can in particular be arranged at the rear in the vehicle longitudinal direction, that is to say against the direction of travel. That is to say, it can be the rear side or back of the transport vehicle. In that case, at least one rack unit can be removed from the load area via the loading side, in particular this can also apply to a plurality of rack units or to all the rack units. In a corresponding manner, the rack unit in question can be introduced into the load area via the loading side, or a different rack unit which replaces the previous rack unit can be introduced. In this way, a flexible arrangement of different rack units is possible according to requirements. The rack units can differ in respect of their form or also merely in respect of their contents. Thus, for example, empty rack units could be removed and replaced by full rack units. In this context, it can be advantageous if the rack unit can be detected by the transport vehicle or is even configured to actively communicate with the transport vehicle, for example by means of the above-mentioned rack control unit and vehicle control unit. It is, however, also conceivable that only one rack unit communicates directly with the transport vehicle, while the other rack units communicate indirectly with the transport vehicle by communication from rack unit to rack unit. The transport vehicle can obtain a wide variety of information, for example about the form of the rack unit, the contents thereof and/or its current position within the load area. In connection with the contents, the rack unit can also store information about the destination location of the contents, which can then be transmitted to the transport vehicle.

In order to facilitate the displacement of the rack units, the rack units can have rollers, wheels or other rolling bodies, so that only rolling friction occurs. In some circumstances, for example if the substrate of the load surface is sufficiently smooth, the rack units can, however, also have sliding elements, for example feet with a low coefficient of friction. Alternatively or additionally, it is possible that the load surface has a roller conveyor on which the rack units can be displaced or moved with low friction. The rolling bodies can have fixing brakes, which prevent the rack unit from unintentionally rolling away. The fixing brake can be operable manually, for example, for example by way of a pedal. It can, however, also be operated by means of an actuator, wherein automatic operation initiated by the above-mentioned rack control unit is also conceivable. If the rack units can be introduced into the load area, rails, which serve as guide elements for the rolling bodies, can have an intake region in which the rail tapers from the end. That is to say, when the rolling body is inserted, it is automatically aligned correctly by the tapering profile.

In principle, it is conceivable that the rack units are displaceable manually, which also includes the possibility that mechanical auxiliary mechanisms such as gears with transmission are provided, which facilitate manual handling. Nevertheless, manual displacement of the rack units can be arduous for the user or, depending on the situation, even impossible, for example if the transport vehicle is situated on an incline, so that part of the weight of the rack unit acts against the displacement. For this reason, the rack units may be displaceable by use of an actuator. That is to say, at least one actuator or motor is provided for displacing the rack unit. The actuator can be actuated in different ways, in the simplest case by a user specifying the movement direction, for example by pressing a button, and activating the actuator until the intended position of the rack unit has been reached. Advantageously, however, a control unit is adapted to control the displacement by use of an actuator. For example, the vehicle control unit can actuate the at least one actuator via the rack control unit in such a manner that the intermediate space between two rack units that are provided is opened as a result. The control unit can here also control the simultaneous displacement of a plurality of rack units without difficulty, whereby time can be saved compared to manual operation of the at least one actuator. In addition to or also independently of the displacement by use of an actuator, the control unit can also control the locking of the rack unit in an intended position. By combining information about the destination location of the contents of the rack units with a current position (e.g., determined by GPS) of the transport vehicle or with an intended next stopping point, the control unit can automatically determine the location at which the intermediate space is to be opened.

When the rack units extend over the entire width of the load area or over almost the entire width thereof, it can be advantageous for the user if a standing area is available for him or her outside the load surface. The transport vehicle can here have an accessible footboard which, regardless of the position of the intermediate space, can at least be arranged on the access side laterally to the load surface adjacent to the intermediate space. The footboard can be able to be extended or folded out, that is to say adjustable between a space-saving stowed position and a use position, in which it is accessible.

For various reasons, the rack unit can require an electrical energy source. Therefore, each rack unit can advantageously have a rack battery unit which it can be operated, namely even if it is not connected to an external energy supply. The rack battery unit can be integrated in the rack unit. It can have one or more batteries, which can optionally also be arranged at different locations within the rack unit. The rack battery unit serves to operate the rack unit, or to operate at least one system of the rack unit. Generally, the rack battery unit is a rechargeable battery unit, in one example.

The rack unit and the transport vehicle can here have electrical connectors which are matched to one another and via which the transport vehicle can be connected to the rack battery unit of the rack unit for energy transfer. The rack unit thus has a first connector or rack-mounted connector which is matched to a second connector or vehicle-mounted connector of the transport vehicle, so that these two connectors can be electrically connected together. The connectors, which can also be referred to, for example, as plugs or sockets or as interfaces, are normally configured to be connected together by interlocking engagement. By connection of the electrical connectors, an energy transfer between the rack battery unit and the transport vehicle is possible. At least an energy transfer from the rack battery unit to the transport vehicle, or the extraction of energy from the rack battery unit, is normally possible. The range of the transport vehicle can thus be increased. The transport vehicle generally has an internal vehicle battery unit, which could be charged by the energy transfer. The vehicle battery unit can have one or more batteries, which can optionally also be arranged at different locations within the transport vehicle. It is an internal battery unit of the transport vehicle, which is thus integrated in the transport vehicle and is not normally designed to be removed during normal operation of the transport vehicle.

Since in this embodiment the vehicle battery unit is able to extract energy from the at least one rack battery unit as required, it can be made smaller and lighter because it requires only a relatively low charging capacity. Rack units with wholly or partially discharged rack battery units can thus be exchanged, for example at a logistics hub, for rack units with charged rack battery units, so that charging of the vehicle battery unit can in some circumstances be dispensed with. It is also conceivable that the transport vehicle is adapted such that an electric drive motor of the transport vehicle can be operated at least temporarily solely by the at least one rack battery unit. Additionally or alternatively to an energy transfer between the transport vehicle and a rack battery unit, it is possible that the transport vehicle is adapted to charge the rack battery unit of one rack unit by use of the rack battery unit of another rack unit. In other words, the transport vehicle, which is connected to the rack battery units of at least two rack units, can extract electrical energy from a first rack battery unit and supply it (at least partially) to a second rack battery unit.

A particularly advantageous embodiment provides that at least one guide element is configured to support a rearmost rack unit in the vehicle longitudinal direction in such a manner that said rack unit can be displaced backwards beyond the load surface. That is to say, it is thus possible to displace the rearmost rack unit backwards out of the actual load area. The guide element can be telescopic, for example, in order to support the rack unit even when the rack unit is no longer arranged (fully) on the load surface. In this embodiment, the corresponding displacement of the rearmost rack unit can be a requirement for the intermediate space to be formed in the first place. Thus, for example, the length of the load surface could correspond to the overall length of all the rack units, so that the rack units can be accommodated fully on the load surface only if they are all arranged adjacent to one another without appreciable gaps. An optimal, because minimal, overall length of the transport vehicle is thereby obtained. If the user wishes to access a rack unit, at least the rearmost rack unit must be displaced backwards. Because it thus moves backwards beyond the normal dimensions of the transport vehicle, it could be checked by use of sensors, for example ultrasonic sensors, whether there is sufficient space behind the transport vehicle before the displacement is carried out.

One embodiment provides that each rack unit has a drive system which is at least configured to displace the rack unit in the load area. The drive system can be operated independently of an external energy supply, that is to say can be operated in particular by the above-mentioned rack battery unit. There is integrated in each rack unit at least one actuator or motor which acts on a drive element (e.g., a wheel). The drive system can be configured also to displace the rack unit outside the load area, for example in order to assist with the transfer of the rack unit into and out of the load area. The actuator can drive, for example, at least one above-mentioned rolling body (roller, wheel, etc.). The rack unit would thus be self-driving and on the one hand could be displaced within the load area, but on the other hand it could also be moved outside the load area, independently of the transport vehicle, by the drive system. The drive system can be controlled by the above-mentioned rack control unit. The rack control unit can in turn communicate (normally wirelessly) with the vehicle control unit, which transmits control commands at least intermittently, in order to control the movement of the rack unit. Conversely, the rack control unit could in turn transmit position data to the vehicle control unit. Alternatively, the introduction and removal of the rack unit can also be carried out, for example, by use of an external auxiliary device (for example a forklift truck or the like).

As already mentioned, the vehicle can have a roof which extends at least predominantly above the load area and which must of course be supported sufficiently securely on the lower parts of the transport vehicle. Opposite the access side, the roof can be supported on a side wall that is present. One embodiment provides that the roof is partly supported by a rearmost rack unit in the vehicle longitudinal direction. This rack unit is generally permanently integrated in the transport vehicle. For reasons of stability, it is also not normally displaceable in the longitudinal direction, although it would be conceivable to create a connection between the rack unit and the roof which transmits vertical forces on the part of the roof but nevertheless allows a displacement in the vehicle longitudinal direction. In this embodiment, the rearmost rack unit generally forms a rear outer surface of the load area, and for this reason it should have a closed rear wall which should at least be weatherproof.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A transport system comprising:
a transport vehicle comprising:
a load area having a load surface;
a vehicle sidewall; and
a roof which extends at least predominantly above the load area and which is supported, at least partially, by the vehicle sidewall; and
a plurality of rack units arranged on the load surface one behind the other in a vehicle longitudinal direction and configured to be either locked in position or displaced in the vehicle longitudinal direction, whereby an accessible intermediate space can be produced between two adjacent rack units, wherein the transport vehicle is configured such that the intermediate space can be accessed regardless of the position thereof from an access side arranged laterally in a vehicle transverse direction and positioned opposite the vehicle sidewall, wherein the roof is further supported by a rearmost rack unit of the plurality of rack units in the vehicle longitudinal direction, wherein the rearmost rack unit is permanently connected to the load surface of the transport vehicle and is not displaceable in the longitudinal direction of the transport vehicle, and wherein each of the plurality of rack units comprises:
a locking element; and
a latch element, wherein the locking element and the latch element of adjacent rack units of the plurality of rack units are configured to engage such that the adjacent rack units are locked in position relative to one another.

2. The transport system according to claim 1, wherein the load area has at least one guide element which extends in the vehicle longitudinal direction and with which the plurality of rack units cooperate, so that the plurality of rack units are displaceable in a guided manner in the vehicle longitudinal direction.

3. The transport system according to claim 1, wherein the load area is at least partly open on the access side, so that a side wall, arranged on the access side, of at least one rack unit forms an outer surface of the load area.

4. The transport system according to claim 1, wherein the plurality of rack units has sealing elements by which liquid-tight contact between adjacent rack units can be established at least on the access side.

5. The transport system according to claim 1, wherein at least one door arranged on the access side is movable in the vehicle longitudinal direction and configured to close the intermediate space from the access side regardless of the position of the intermediate space.

6. The transport system according to claim 1, wherein at least one rack unit can be removed from and introduced into the load area by way of a loading side.

7. The transport system according to claim 1, wherein the plurality of rack units are displaceable by an actuator.

8. The transport system according to claim 1, wherein the transport vehicle has an accessible footboard which, regardless of the position of the intermediate space, can at least be arranged on the access side laterally to the load surface adjacent to the intermediate space.

9. The transport system of claim 1, wherein each of the plurality of rack units comprises:
a plurality of storage compartments; and
a rack battery unit, wherein the rack battery unit supplies energy to the plurality of storage compartments, such that at least one of the plurality of storage compartments provides a cooling function.

10. The transport system of claim 9, wherein at least one of the plurality of storage compartments provides a disinfecting function.

11. The transport system of claim 1, wherein the plurality of rack units comprises:
a rack battery unit that supplies energy to the plurality of rack units and wherein one of the plurality of rack units has a rack-mounted connector on a second rack side wall of the corresponding rack unit, wherein the rack-mounted connector is connected to a vehicle-mounted connector to effectuate an energy transfer between the corresponding rack unit and a vehicle battery unit of the transport vehicle, and wherein the second rack side wall faces the vehicle side wall.

12. A transport system comprising:
a transport vehicle comprising a load area having a load surface;
a vehicle sidewall;
a roof which extends at least predominantly above the load area; and
a plurality of rack units arranged on the load surface one behind the other in the vehicle longitudinal direction and configured to be either locked in position or displaced in the vehicle longitudinal direction, whereby an accessible intermediate space can be produced between two adjacent rack units, wherein the transport vehicle is configured such that the intermediate space can be accessed regardless of the position thereof from an access side arranged laterally in a vehicle transverse direction, wherein the load area has at least one guide element which extends in the vehicle longitudinal direction and with which the plurality of rack units cooperate, so that the plurality of rack units are displaceable in a guided manner in the vehicle longitudinal direction, and wherein the load area is at least partly open on the access side, so that a side wall, arranged on the access side, of at least one rack unit forms an outer surface of the load area, wherein the plurality of rack units comprises:

a plurality of storage compartments, wherein at least one of the plurality of storage compartments provides a cooling function; and a rack battery unit that supplies energy to the plurality of storage compartments and wherein one of the plurality of rack units has a rack-mounted connector on a second rack side wall of the corresponding rack unit, wherein the rack-mounted connector is connected to a vehicle-mounted connector to effectuate an energy transfer between the corresponding rack unit and a vehicle battery unit, and wherein the second rack side wall faces a vehicle side wall of the transport vehicle that is positioned opposite the access side, wherein the roof is supported by the vehicle sidewall and by a rear-most rack unit of the plurality of rack units in the vehicle longitudinal direction, wherein the rearmost rack unit is permanently connected to the load surface of the transport vehicle and is not displaceable in the vehicle longitudinal direction of the transport vehicle.

13. The transport system according to claim 12, wherein the plurality of rack units have sealing elements by which liquid-tight contact between adjacent rack units can be established at least on the access side.

14. The transport system according to claim 12, wherein at least one door arranged on the access side is movable in the vehicle longitudinal direction and configured to close the intermediate space from the access side regardless of the position of the intermediate space.

15. The transport system according to claim 12, wherein at least one rack unit can be removed from and introduced into the load area by way of a loading side.

16. The transport system according to claim 12, wherein the plurality of rack units are displaceable by an actuator.

17. The transport system according to claim 12, wherein the transport vehicle has an accessible footboard which, regardless of the position of the intermediate space, can at least be arranged on the access side laterally to the load surface adjacent to the intermediate space.

18. The transport system of claim 12, wherein the transport vehicle further comprises a vehicle control unit, wherein the vehicle control unit is configured to:

determine a current location of the transport vehicle;

compare the current location with destination locations of contents of an individual storage compartment of the plurality of storage compartments; and transmit an instruction to a rack control unit in electrical communication with the plurality of rack units to open the individual storage compartment of the plurality of storage compartments.

* * * * *